May 27, 1958
C. R. MINER
2,836,082
LOW-TORQUE DETENT MECHANISM
Filed April 16, 1957
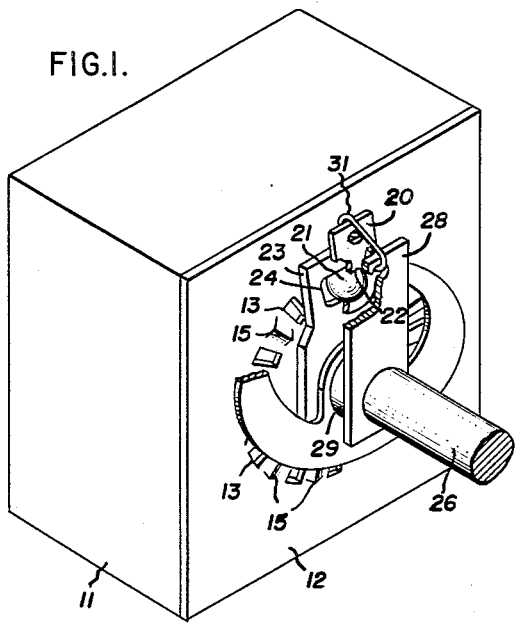
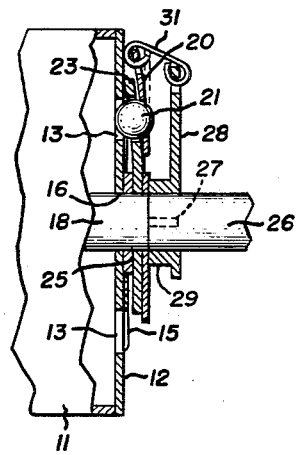
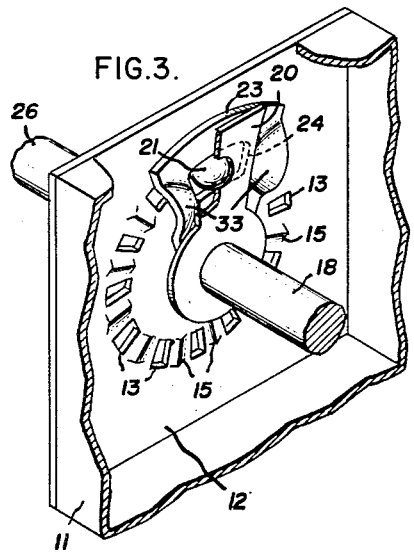
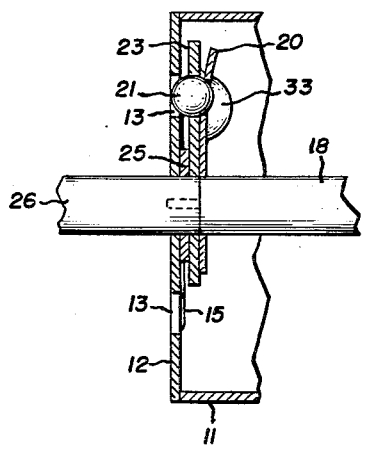
INVENTOR:
CARROLL R. MINER,
BY Donald N. Timbie
HIS ATTORNEY.

United States Patent Office 2,836,082
Patented May 27, 1958

2,836,082

LOW-TORQUE DETENT MECHANISM

Carroll R. Miner, Liverpool, N. Y., assignor to General Electric Company, a corporation of New York Application April 16, 1957, Serial No. 653,205

12 Claims. (Cl. 74—527)

The present invention relates to improvements in detent mechanisms.

Many detent mechanisms, such as the detent mechanisms used in television tuners, have a detent plate with a plurality of circumferentially-located holes. Usually, on one side of this plate there are raised portions that form a single ridge between each of the holes. In fact the holes on some detent plates are not apertures or depressions in the plate but are merely low places formed by the relatively high adjacent ridges. Generally, a detent shaft is rotatably mounted at the center of the circumferentially-located holes. On this shaft there is secured a spring that provides a force in the direction of the detent plate. In some detent mechanisms this spring has a hole in which a detent ball is seated in a manner such that the ball rides over the detent plate holes under pressure from the spring.

Due to the ridges between holes, the detent ball is stationary with respect to the detent plate only when the ball is seated in a hole. When the detent shaft is rotated, the ball moves under spring pressure out of its hole up an adjacent ridge. When the ball is just a little beyond the top of the ridge, the force of the spring is in a direction to aid the movement of the ball. As a result, the ball moves very rapidly down into the next hole. In so moving, the ball drives the spring and the shaft. This snap action of the ball is the desired detent action.

In prior act detent mechanisms, the troque required to move the ball out of its hole and up the adjacent ridge has been so great that many persons have had difficulty in rotating the detent shaft. Also, some people, although able to rotate the shaft, have found the required torque unpleasant to apply.

Accordingly, an object of the present invention is to provide a low-torque detent mechanism.

There are some obvious ways of providing a low-torque detent mechanism. For example, a weak detent spring can be used or the detent plate can be constructed so that the holes have gradually sloping sides. But these methods interfere with the desired detent action because the detent ball will not readily snap in place when pushed by a weak spring. Nor will the ball have much tendency to remain in the bottom of a hole when there is not a sufficient gradient in height between the sides of the hole and the bottom to cause a large component of spring force on the ball in the direction of the bottom.

Another object of the present invention is to provide a low-torque detent mechanism that has the same detent action as conventional non-low-torque detent mechanisms.

Another obvious way of providing a low-torque detent mechanism is through the use of a mechanical-advantage gearing arrangement. But the disadvantage of such a system is that in order to move the detent ball from one hole to the next a person has to rotate the detent shaft through a greater angle than that between adjacent holes.

Therefore, a further object of the present invention is to provide a low-torque detent mechanism that requires no greater angular movement of the detent shaft for a given detent action than is required in a conventional non-low-torque detent mechanism.

In carrying out my invention, I provide in one embodiment a detent mechanism with two shafts that are preferably coaxially aligned. One of the shafts is rotatably mounted on the detent plate. This is the load shaft. It can have the conventional detent spring and detent ball arrangement connected to it. The other shaft, that I shall call the drive shaft, has a drive plate secured to it. This drive plate is joined to the spring by a connector. With this arrangement, when the drive plate is rotated it pulls the spring by means of the connector. This pull or force has a component that is opposed to the force of the spring on the ball. With less force on the ball, the drive shaft, which drives the load shaft through the connector, is easier to rotate than is the detent shaft of a conventional detent mechanism. Due to the conversion of some of the rotating movement of the drive shaft into a movement of the spring away from the detent ball rather than in a rotation of the load shaft, the drive shaft must be rotated under torque through a greater angle than is the detent shaft of a conventional system. But, as will be shown, the non-torque movement of the drive shaft, that is the movement of the drive shaft when it is driven by the detent action, is less by an amount that renders the total angular movement of this drive shaft the same as in a conventional system.

The features of my invention that I believe to be novel are set forth with particularity in the appended claims. My invention itself, however, both as to its organization and method of operation, together with further objects and advantages thereof, may best be understood by reference to the following description taken in connection with the accompanying drawing in which:

Fig. 1 is a perspective view, partly in section, of one embodiment of the present invention, Fig. 2 is a side view, partly in section, of the embodiment of Fig. 1, Fig. 3 is a perspective view of another embodiment of the present invention, and Fig. 4 is a side view, partly in section, of the embodiment of Fig. 3.

In my embodiment shown in Figs. 1 and 2 there is a box 11 enclosing a load that is to be driven by a detent mechanism. In a television receiver this load is a tuner. Mounted at one end of box 11 is a detent plate 12 with a plurality of holes 13. On one side of plate 12 there are a plurality of ridged portions 15 arranged so that there is one ridged portion between each pair of adjacent holes 13. Holes 13 and ridged portions 15 are circumferentially-located about a central hole 16. The detent plate 12 having holes 13 and 16 and ridges 15 is only one suitable type of detent plate that can be used in the present invention; there are many others equally suitable. For example, some detent plates do not have ridges; others have holes that are depressions rather than apertures; etc. In spite of these differences most, if not all, of the various types of detent plates can be used in the present invention.

In hole 16 a load shaft 18 (shown only in Fig. 2) is rotatably mounted. I call shaft 18 a "load" shaft because it is the driving means for the load in box 11. On shaft 18 there is secured a means for resiliently engaging the holes in detent plate 12. The specific means shown comprises a spring 20 and a hole engaging means that is a ball 21. Spring 20 has a hole 22 into which ball 21 seats. The distance of the hole 22 from shaft 18 is such that ball 21 rides over the holes 13 and ridged portions 15 of plate 12 when shaft 18 rotates. My invention is not limited to this particular type or resilient engaging means. In fact there are probably very few, if any, types of resilient engaging means that would not be suitable for use in my invention. An example of another suitable type is one in which spring 20 has a rounded projection extending from it that engages holes 13. This rounded projection performs the function of and takes the place of ball 21. There are no doubt many other types of resilient engaging means that are equally suitable.

In a ball-type detent mechanism, it is common to use a flag plate 23 that has an aperture 24 in which ball 21 is located. The only purpose of this flag plate in the embodiment of Figs. 1 and 2 is to restrain ball 21 from popping out of hole 22 in spring 20. If desired, flag plate 23 can be separated from detent plate 12 by means of a washer 25.

A drive shaft 26 is shown rotatably mounted with respect to load shaft 18. Drive shaft 26 is the shaft to which the input torque is applied. If this detent mechanism were used in a television receiver a channel-selector knob would be joined to an end of shaft 26. Shafts 18 and 26 are preferably coaxially aligned. A coaxial alignment simplifies the rotatable mounting for shaft 26. For example, with this alignment the mounting can comprise a male pin 27 extending from an end of shaft 18 that seats in a correspondingly-shaped female socket (not numbered) in the end of shaft 26. For simple detent mechanisms having holes 13 that extend over only a small arc, coaxial alignment of shafts 18 and 26 is not necessary. However, this alignment is necessary when these holes extend over a large arc. The difference in requirements for alignment is due to the practical mechanical fact that when these shafts are not coaxially aligned there is a large change in spacing between the components mounted on shaft 18 and those mounted on shaft 26 (they have not yet been mentioned) when these shafts are rotated through a large arc. On the other hand, there is only a small change in spacing when they are rotated through a small arc. The mechanical tolerance of the components can be constructed so that small changes in distance can be tolerated. But this is not feasible for large changes in distance.

One of the two structures mounted on drive shaft 26 is a drive plate 28. The other structure is a collar 29 that can be made integral or separate from plate 28.

The only drive connection between drive shaft 26 and load shaft 18 is through a connector 31 that is joined between upper portions of spring 20 and drive plate 28. As will be subsequently shown, drive plate 28 and connector 31 are a means for reducing the force that spring 20 applies against ball 21.

The manner in which the embodiment of Figs. 1 and 2 provides a low-torque operation feature but retains the same centering, locking and detent action of prior art detent mechanisms is as follows. When the operator rotates drive shaft 26, drive plate 28 pulls on connector 31 which in turn pulls upon spring 20. Due to the separation between plate 28 and spring 20, connector 31 pulls on spring 20 in a direction that has a component that is outward and parallel to the axis of shaft 26. Thus, this component of pull is in a direction opposed to the force of spring 20 on ball 21. The resulting lessening of the force of spring 20 on ball 21 lessens the torque required to drive load shaft 18. Further rotation of shaft 26 rotates ball 21 up the adjacent ridged portion 15 until the ball reaches the top of this portion. On the downward side of this ridged portion the action of spring 20 aids the movement of ball 21. Consequently, the ball moves at a speed that is much greater than the turning rate of drive shaft 26. In so moving, ball 21 drives spring 20 and thus load shaft 18 at a very rapid rate. At this high rate of speed, spring 20 moves forward of driving plate 28 thereby releasing the tension of connector 31 on spring 20. Consequently, the total force of spring 20 is then on ball 21. As a result, ball 21 is driven into the next hole 13 with the same action it would have in a conventional non-low-torque detent mechanism.

It should be apparent from the above explanation that drive shaft 26 is not rotated through a greater angle than that between adjacent detent plate holes 13. It is true, however, that the angular movement of drive shaft 26, under torque, is greater than in conventional detent mechanisms. To illustrate this, assume there is an angle of 20 degrees between a hole 13 and the peak of an adjacent ridged portion 15. In a conventional system the detent shaft must be torque driven through this angle of 20 degrees in order to move ball 21 from this hole to the next. Of course the detent shaft must move through a total angle of 40 degrees—the angle between holes. But the shaft 26 is under torque only during the first half of this angle, because only in this angle does the ball move up the adjacent ridged portion. During the last 20 degrees the ball moves down the opposite slope of the ridged portion 15 and so drives the drive shaft 26 rather than being driven by it.

In contrast, in my invention the first few degrees of angular movement of drive shaft 26 do not produce a corresponding movement of ball 21. For example, in the first 10 degrees of movement of shaft 26, ball 21 may only move through an arc of 4 degrees. The other 6 degrees of movement of shaft 26 are absorbed in distorting spring 20 to the dotted line position shown in Fig. 2. This movement of spring 20 is necessary to lessen the force of this spring upon ball 21. In addition to this initial movement of 10 degrees, shaft 26 must be driven through 16 more degrees in order to move ball 21 through the 20 degree arc necessary to get ball 21 to the top of adjacent ridged portion 15. Thus, shaft 26 is under torque for 10 plus 16 degrees or 26 degrees as compared to 20 degrees for the detent shaft of a conventional detent mechanism. These figures were selected only to illustrate the operation of my device and were not intended as representative figures for an actual detent mechanism.

Another manner in which the operation of my embodiment of Figs. 1 and 2 can be explained is through a consideration of work. To illustrate this, assume that the strength of the detent spring 20 and the load in box 11, the distance between holes 13, and the heights of ridged portions 15 are the same in a conventional detent mechanism and in a detent mechanism embodying my invention. Then, the same amount of work must be done in both detent mechanisms to move the detent ball (and thus the load shaft) from one position to the next. The work must be the same because the force (the force of spring 20 plus the force of the load) and the distance to be travelled by the detent ball under force (the distance from a hole 13 to the top of a ridged portion 15) are the same in both detent mechanisms. Because, as previously shown, the drive shaft 26 in my invention produces a driving torque through a greater angle than do the detent shafts of conventional detent mechanisms, less torque is required in my invention to do this same work. This follows from the physical law that torque times angle equals work.

In Figs. 3 and 4 a second embodiment of the present invention is shown. Structure in these figures corresponding to structure in the first embodiment have the same reference numerals. In this second embodiment the means for reducing the force of spring 20 is shown to be raised portions 33 on flag plate 23 instead of the connector 31 and drive plate 28 of the first embodiment. Another difference in the two embodiments is that in the second embodiment flag plate 23 is mounted to drive shaft 26 rather than to load shaft 18. Also, in the second embodiment the aperture 24 in the flag plate 23 must be appreciably wider than the diameter of ball 21. In contrast, in my first embodiment the size of aperture 24 need only be large enough to permit clearance of ball 21.

In the operation of the second embodiment, the first few degrees of rotation of drive shaft 25 move an edge of aperture 24 towards ball 21 but do not produce any rotation of load shaft 18. There is no rotation of load shaft 18 because the only drive connection between the two shafts is through ball 21 and ball 21 is not driven until an edge of aperture 24 strikes it. Thus, ball 21 and spring 20, which is secured to ball 21, do not move during the initial movement of flag plate 23 before an edge of aperture 24 has struck ball 21. The relative movement between plate 23 and spring 20 permits one of the raised portions 33, the particular one depending upon the direction of movement of plate 23, to slip under spring 20. This raised portion then pries spring 20 back from ball 21 thereby relieving some of the force of the spring upon the ball. Then, when an edge of aperture 24 strikes ball 21, this ball moves out of its hole 13 and up the adjacent ridged portion 15 with the application of less force than would have been required if the effect of spring 20 had not been reduced. Of course, if less force is required to move ball 21, less torque is required to rotate drive shaft 26.

From the above, it is seen that the second embodiment is also a low-torque detent mechanism. As in the first embodiment, drive shaft 26 of the second embodiment is rotated under torque through a greater angle than that between the hole in which ball 21 is seated and the top of the adjacent ridged portion 15. The reason for this greater torque angle is that during the first few degrees of angular movement of shaft 26, before the edge of aperture 24 strikes ball 21, ball 21 is not moved. During this initial movement shaft 26 is under torque because it, through raised portions 33, is causing spring 20 to be bent away from ball 21. In addition to this initial movement, shaft 26 must be rotated through an angle equal to that between the hole in which ball 21 is seated and the top of the adjacent ridged portion in order to move ball 21 through this angle. During this latter movement drive shaft 26 is also under torque because it drives flag plate 23 that, in turn, forces ball 21 up the adjacent ridge against the weakened force of spring 20.

Although the invention has been described by reference to a particular embodiment thereof, it will be understood that numerous modifications can be made by those skilled in the art without departing from the invention. I therefore, aim in the appended claims to cover all such equivalent variations as come within the true spirit and scope of my invention.

What I claim as new and desire to secure by Letters Patent of the United States is:

1. A detent mechanism that is movable with less torque from one position to another while retaining strong detent action, said detent mechanism comprising in combination: a plate having holes therein, a load shaft extending through said plate, means secured to said load shaft for resiliently engaging said holes, a drive shaft, and means secured to said drive shaft for reducing the force with which said means engages said holes when said drive shaft is rotated with respect to said load shaft.

2. The detent mechanism as defined in claim 1 wherein said means secured to said load shaft for resiliently engaging said holes comprises: a spring mounted on said load shaft, and hole engaging means that is under spring pressure from said spring.

3. The detent mechanism as defined in claim 2 wherein said hole engaging means comprises: a ball.

4. The detent mechanism as defined in claim 2 wherein said means for reducing the force comprises: a drive plate connected to said drive shaft, and a connector connected between said drive plate and said spring.

5. A detent mechanism that is movable with less torque from one position to another while retaining strong detent action, said detent mechanism comprising, in combination, a plate having holes therein, a drive shaft extending through said plate, a load shaft rotatably mounted with respect to said drive shaft, a spring mounted on said load shaft, hole engaging means that is under spring pressure from said spring, a flag plate connected to said drive shaft, and at least one raised portion on said flag plate for engaging said spring.

6. A detent mechanism comprising: a detent plate having holes therein, a load shaft mounted substantially normal to the plane of said detent plate, a spring mounted on said load shaft, means secured to said spring so as to be forced under spring pressure against said detent plate to engage the holes therein, a drive shaft, and means secured to said drive shaft for providing a force against said spring in response to movement of said drive shaft with respect to said load shaft.

7. The detent mechanism as defined in claim 6 wherein said spring has a hole in it, and the means for engaging the holes in the detent plate is a ball mounted in the hole in said spring.

8. The detent mechanism as defined in claim 6 wherein said means for providing a force against said spring comprises: a drive plate connected to said drive shaft, and a connector joined between said drive plate and said spring.

9. The detent mechanism as defined in claim 6 wherein said means for reducing the force comprises: a flag plate connected to said drive shaft, and at least one raised portion on said flag plate for engaging said spring.

10. A detent mechanism that is movable with less torque from one position to another but that also has strong detent action, said detent mechanism comprising in combination: a first plate having a central hole and a plurality of holes located circumferentially on a circle having its center at said central hole; a first shaft mounted in said central hole; a second plate mounted on said first shaft adjacent said first plate, said second plate having an aperture therein located adjacent said plurality of holes of said first plate, said second plate also having raised portions thereon; a ball of smaller dimensions than said aperture mounted within said aperture; a second shaft mounted coaxially with said first shaft; and a spring affixed to said second shaft for providing a force on said ball.

11. The detent mechanism as defined in claim 10, wherein said spring is secured to said ball by means of a hole in said spring into which said ball seats.

12. A detent mechanism comprising in combination: a first plate having a central hole and a plurality of holes located circumferentially on a circle having its center at said central hole; a first shaft; a second shaft mounted coaxially with said first shaft, one of said shafts being mounted in said central hole; a ball; a spring mounted on said second shaft and having a hole therein into which said ball is seated, said spring being so located that said ball is pressed into said holes of said first plate under pressure by said spring when said second shaft is in predetermined angular positions; a drive plate on said first shaft; and a connector between said first shaft and said spring for converting part of a force resulting from rotation of said first shaft into a force opposing the force of said spring upon said ball.

No references cited.